(12) United States Patent
Dasari et al.

(10) Patent No.: US 8,923,320 B2
(45) Date of Patent: Dec. 30, 2014

(54) SYSTEMS AND METHODS FOR AUTOMATING VIRTUAL NETWORK INTERFACE CONTROLLER CONFIGURATION DURING WORKLOAD PROVISIONING

(71) Applicant: Dell Products L.P., Round Rock, TX (US)

(72) Inventors: Pallavi Dasari, Austin, TX (US); Sudhir Shetty, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 13/709,200

(22) Filed: Dec. 10, 2012

(65) Prior Publication Data

US 2014/0161137 A1    Jun. 12, 2014

(51) Int. Cl.
| | | |
|---|---|---|
| H04J 3/16 | (2006.01) | |
| H04L 12/28 | (2006.01) | |
| H04L 12/66 | (2006.01) | |
| H04L 12/911 | (2013.01) | |

(52) U.S. Cl.
CPC ...................................... H04L 47/82 (2013.01)
USPC ............................ 370/437; 370/419; 370/463

(58) Field of Classification Search
USPC .................. 370/229, 231, 235, 359, 419, 463
See application file for complete search history.

(56) References Cited

U.S. PATENT DOCUMENTS

| | | | | |
|---|---|---|---|---|
| 6,243,360 B1* | 6/2001 | Basilico | ......................... | 370/231 |
| 7,706,271 B2* | 4/2010 | Wakayama et al. | ........... | 370/235 |
| 8,542,578 B1* | 9/2013 | Filsfils et al. | ................. | 370/228 |
| 8,553,552 B2* | 10/2013 | Hu et al. | ....................... | 370/235 |
| 8,677,356 B2* | 3/2014 | Jacobs et al. | ....................... | 718/1 |
| 2009/0323690 A1* | 12/2009 | Lu et al. | ........................ | 370/392 |
| 2010/0115174 A1* | 5/2010 | Akyol et al. | .................. | 710/316 |
| 2012/0163174 A1* | 6/2012 | Shukla et al. | ................. | 370/235 |
| 2013/0258835 A1* | 10/2013 | Colven et al. | ................. | 370/216 |
| 2014/0108584 A1* | 4/2014 | Lu | ................................ | 709/208 |

* cited by examiner

Primary Examiner — Warner Wong
(74) Attorney, Agent, or Firm — Jackson Walker L.L.P.

(57) ABSTRACT

In accordance with embodiments of the present disclosure, an information handling system may include a network interface and a processor. The network interface may include a plurality of physical ports, each physical port configured to be coupled to a corresponding switch interfacing between the physical port and a switching fabric comprising one or more virtual local area networks. The processor may be configured to receive workload requirements defining operational parameters for one or more virtual network interface controllers and automatically assign each of the one or more virtual network interface controllers to a partition of one of the plurality of physical ports based on the operational parameters.

20 Claims, 4 Drawing Sheets

SYSTEMS AND METHODS FOR AUTOMATING VIRTUAL NETWORK INTERFACE CONTROLLER CONFIGURATION DURING WORKLOAD PROVISIONING

TECHNICAL FIELD

The present disclosure relates in general to information handling systems, and more particularly to automating virtual network interface controller configuration during workload provisioning.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A network interface controller (NIC) (also known as a network interface card, network adapter, local area network adapter, and other terms) is a physical hardware component that communicatively couples an information handling system to a network of one or more other information handling systems. In some cases, it is desirable or useful for a network administrator or other user to provision one or more virtual NICs for an information handling system. A virtual NIC is an abstract virtualized representation of an information handling system network interface that may or may not correspond directly to a physical network interface. The virtual NIC may appear to an operating system as a full-fledged NIC (e.g., an Ethernet NIC), complete with its own Media Access Control (MAC) address. The NIC emulation can be coupled to a host operating system in at least two ways. First, it may be bridged to the same physical network as a physical NIC. Second, it may be coupled to a virtual network created on the host operating system.

Traditionally, a virtual NIC is provisioned manually, wherein a user identifies the workload requirements (e.g., bandwidth, priority, redundancy, connectivity, etc.) for the virtual NIC and associates it with one or more partitions of a physical NIC in order to implement the virtual NIC. Such manual provisioning is cumbersome and can often lead to error.

SUMMARY

In accordance with the teachings of the present disclosure, the disadvantages and problems associated with provisioning virtual network interface controllers have been reduced or eliminated.

In accordance with embodiments of the present disclosure, an information handling system may include a network interface and a processor. The network interface may include a plurality of physical ports, each physical port configured to be coupled to a corresponding switch interfacing between the physical port and a switching fabric comprising one or more virtual local area networks. The processor may be configured to receive workload requirements defining operational parameters for one or more virtual network interface controllers and automatically assign each of the one or more virtual network interface controllers to a partition of one of the plurality of physical ports based on the operational parameters.

In accordance with these and other embodiments of the present disclosure, a computer-implemented method may include receiving workload requirements defining operational parameters for one or more virtual network interface controllers. The method may also include automatically assigning each of the one or more virtual network interface controllers to a partition of one of a plurality of physical ports, wherein each physical port is configured to be coupled to a corresponding switch interfacing between the physical port and a switching fabric comprising one or more virtual local area networks based on the operational parameters.

In accordance with these and other embodiments of the present disclosure, an article of manufacture may include a computer readable medium and computer-executable instructions carried on the computer readable medium. The instructions may be readable by a processor, the instructions, when read and executed, for causing the processor to: (i) receive workload requirements defining operational parameters for one or more virtual network interface controllers; and (ii) based on the operational parameters, automatically assign each of the one or more virtual network interface controllers to a partition of one of a plurality of physical ports, wherein each physical port is configured to be coupled to a corresponding switch interfacing between the physical port and a switching fabric comprising one or more virtual local area networks.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components or the information handling system may include one or more storage devices, one or more communications ports for communicating with external devices as well as various input and output ("I/O") devices, such as a keyboard, a mouse, and a video display. The information handling system may also include one or more busses operable to transmit communication between the various hardware components.

For the purposes of this disclosure, information handling resources may broadly refer to any component system, device or apparatus of an information handling system, including without limitation processors, busses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Figure 1:
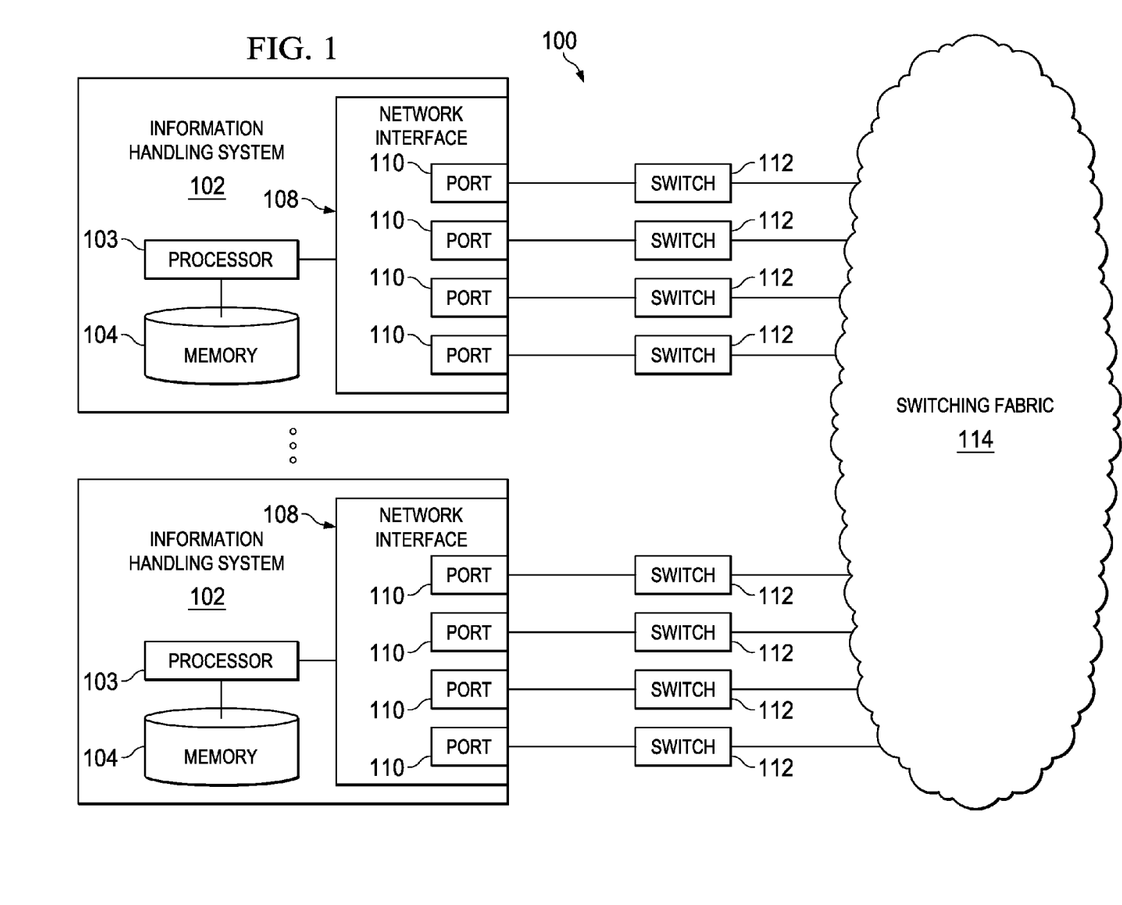
FIG. 1 illustrates a block diagram of an example system with multiple information handling systems coupled to a switching fabric, in accordance with certain embodiments of the present disclosure.

FIG. 1 illustrates a block diagram of an example system 100 with multiple information handling systems 102 coupled to a switching fabric 114, in accordance with certain embodiments of the present disclosure. As depicted in FIG. 1, system 100 may comprise a plurality of information handling systems 102, a plurality of switches 112, and a switching fabric 114.

An information handling system 102 may generally be operable to receive data from and/or communicate data to switching fabric 114 via network interfaces 108 and switches 112. In certain embodiments, an information handling system 102 may be a server. In such embodiments, an information handling system 102 may comprise a blade server having modular physical design. As depicted in FIG. 1, an information handling system 102 may include a processor 103, a memory 104 communicatively coupled to processor 103, and one or more network interfaces 108 communicatively coupled to processor 103.

A processor 103 may include any system, device, or apparatus configured to interpret and/or execute program instructions and/or process data, and may include, without limitation a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in memory 104 and/or another component of system 100.

A memory 104 may be communicatively coupled to an associated processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off. Although memory 104 is depicted in FIG. 1 as integral to information handling system 102, in some embodiments memory 104 may be remotely coupled to information handling system 102 (e.g., via a network), as in embodiments in which memory 104 comprises network-attached storage.

A network interface 108 may include any suitable system, apparatus, or device operable to serve as an interface between an associated information handling system 102 and switching fabric 114. Network interface 108 may enable its associated information handling system 102 to communicate with the external network using any suitable transmission protocol (e.g., TCP/IP) and/or standard (e.g., IEEE 802.11, Wi-Fi). In certain embodiments, network interface 108 may include a physical NIC. In the same or alternative embodiments, network interface 108 may be configured to communicate via wireless transmissions. In the same or alternative embodiments, network interface 108 may provide physical access to a networking medium and/or provide a low-level addressing system (e.g., through the use of Media Access Control addresses). In some embodiments, network interface 108 may be implemented as a local area network ("LAN") on motherboard ("LOM") interface. Network interface 108 may comprise one or more suitable network interface cards, including without limitation, mezzanine cards, network daughter cards, etc.

As shown in FIG. 1, a network interface 108 may have one or more physical ports 110. Each physical port 110 may include any system, device or apparatus configured to serve as a physical interface between a corresponding switch 112 and network interface 108. For example, a physical port 110 may comprise an Ethernet port, an optical port, or any other suitable port.

A switch 112 may comprise any system, device, or apparatus configured to couple an information handling system 102 to switching fabric 114 and perform switching between information handling systems 102 and various virtual local area networks (VLANs) of switching fabric 114. In certain embodiments, a switch 112 may comprise a PCIe switch (e.g., a network switch assigned to physical ports 110 or to the physical partition layer of a network interface). In other embodiments, a switch 112 may comprise a generalized PC bus switch, an Infiniband switch, or other suitable switch.

Switching fabric 114 may be a network and/or fabric configured to communicatively couple information handling systems to each other. In certain embodiments, switching fabric 114 may include a communication infrastructure, which provides physical connections, and a management layer, which organizes the physical connections of information handling systems 102 and other devices coupled to switching fabric 114. Switching fabric 114 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Switching fabric 114 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Switching fabric 114 and its various components may be implemented using hardware, software, or any combination thereof.

In some embodiments, switching fabric 114 may comprise one or more VLANs, which virtual NICs executing on an information handling system 102 may access, in accordance with the present disclosure.

In some embodiments, one or more components of system 100 may be disposed in a chassis or enclosure configured to house such components. In other embodiments, components of system 100 may be separated into two or more separate enclosures.

Figure 2A:
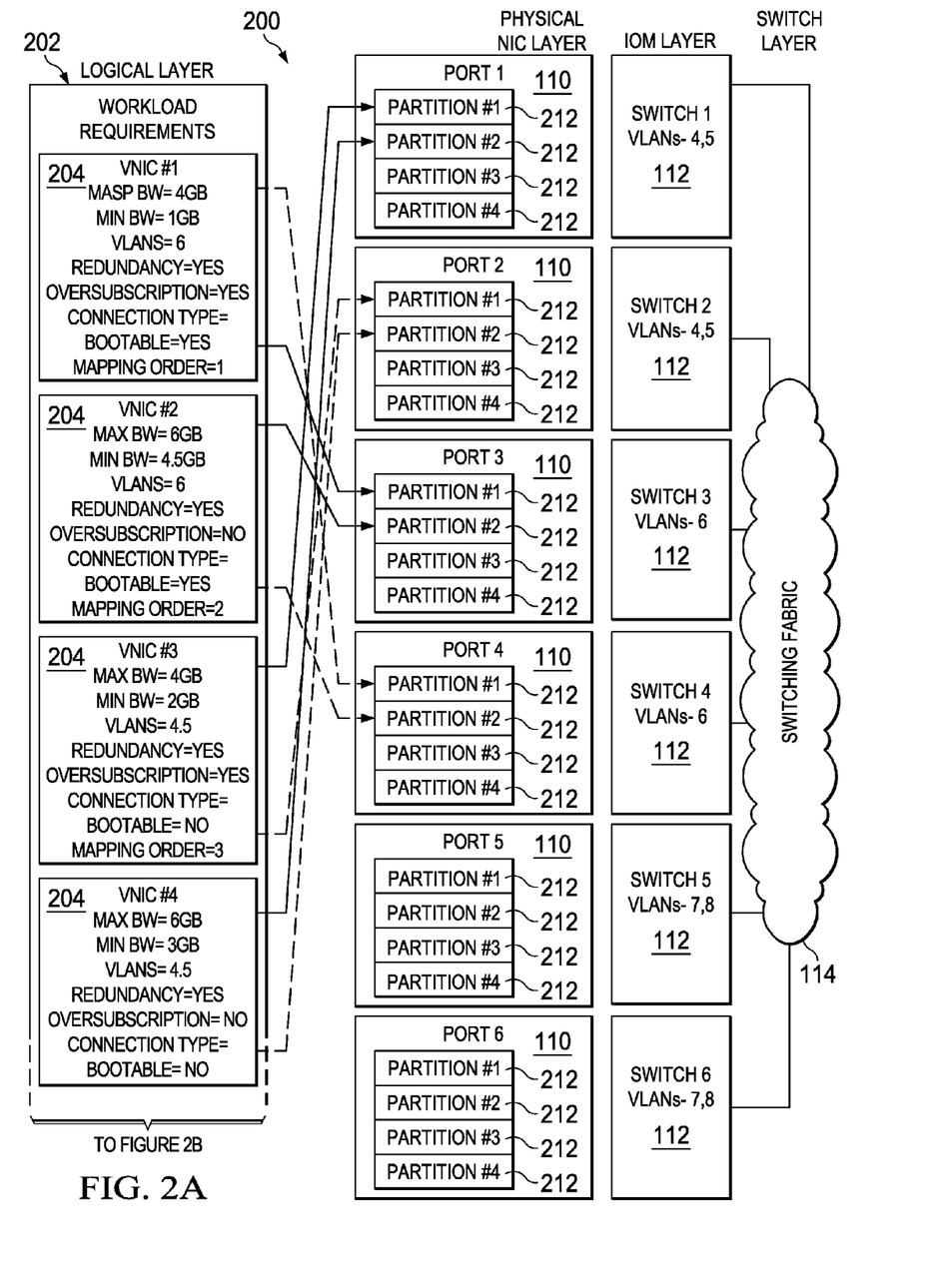
FIGS. 2A and 2B, collectively referred to as FIG. 2, illustrate a more detailed block diagram of various networking layers used in connection with provisioning of a virtual NIC, in accordance with certain embodiments of the present disclosure.
Figure 2B:
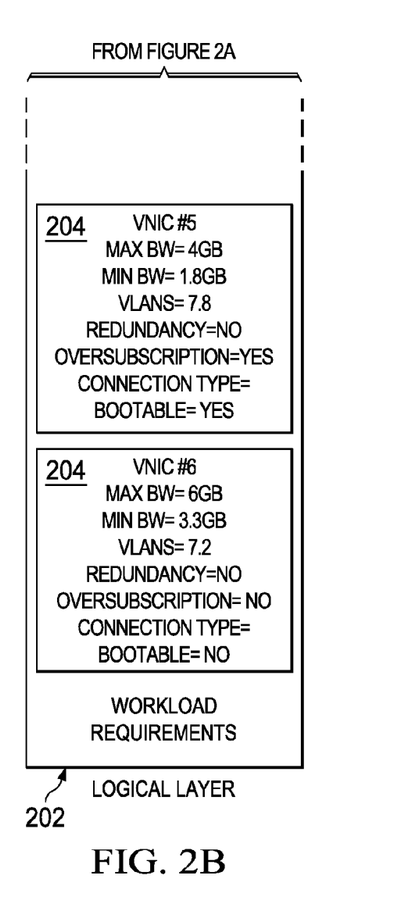

FIG. 2 illustrates a more detailed block diagram of a system 200 of various networking layers used in connection with provisioning of a virtual NIC, in accordance with certain embodiments of the present disclosure. At a logical layer, a user may specify workload requirements 202 for one or more virtual NICs 204 to be provisioned. Such workload requirements 202 may include one or more parameters related to the virtual NICs 204 to be provisioned, including a maximum bandwidth, a minimum bandwidth, identity of VLANs to which a virtual NIC 204 is to be communicatively coupled (e.g., whether bandwidth oversubscription is enabled for the virtual NIC 204 and/or mapping order indicating how the mapping is performed from a logical vNIC layer to a physical partition layer), sequence order, whether the virtual NIC 204 is to have redundancy, and whether the virtual NIC 204 is bootable.

Each virtual NIC 204 may, as discussed in greater detail elsewhere herein, be assigned to and provisioned to one or more partitions 212 of a physical port 110 based on the various workload requirements. Such physical ports 110 and partitions 212 may comprise a physical NIC layer as depicted in FIG. 2. In accordance with NIC partitioning, a single physical port 110 may be configured as a plurality (e.g., four) of separate partitions or functions. Each partition may appear to an information handling system memory or operating system as a discrete physical NIC, and each partition 212 may behave as an independent NIC port.

FIG. 2 also depicts an I/O module (IOM) layer comprising switches 112, wherein each switch 112 is communicatively coupled to one or more VLANs on switching fabric 114. FIG. 2 further depicts a switch layer comprising switching fabric 114.

Figure 3:
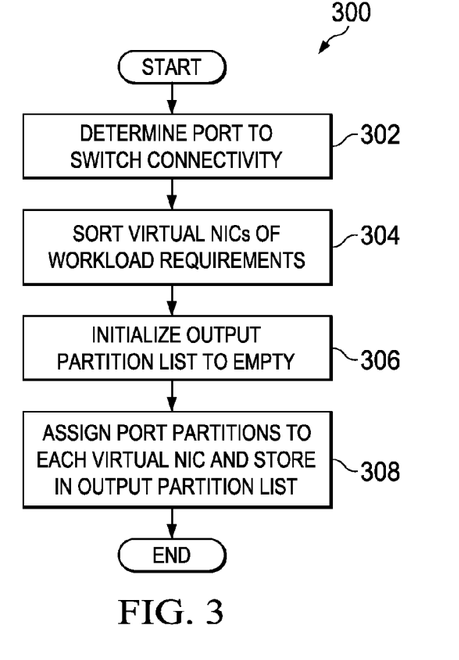
FIG. 3 illustrates a flow chart of an example method for provisioning virtual NICs, in accordance with certain embodiments of the present disclosure.

FIG. 3 illustrates a flow chart of an example method 300 for provisioning virtual NICs 204, in accordance with certain embodiments of the present disclosure. According to certain embodiments, method 300 may begin at step 302. As noted above, teachings of the present disclosure may be implemented in a variety of configurations of system 100 as shown in FIGS. 1 and 2. As such, the preferred initialization point for method 300 and the order of the steps comprising method 300 may depend on the implementation chosen.

At step 302, port 110 to switch 112 connectivity may be determined. At step 304, virtual NICs 204 as set forth in the workload requirements 202 may be sorted in any suitable fashion (e.g., by identifier, minimum bandwidth, sequence order, or another appropriate sorting technique). In some embodiments, virtual NICs 204 may be sorted based on user-defined parameters (e.g. sequence order). At step 306, an output partition list that will list the associations between virtual NICs 204 and partitions 212 is initialized to be empty. At step 308, port partitions 212 may be assigned to each virtual NIC 204 and stored in the output partition list. Assignment for each virtual NIC 204 may be performed in a manner identical or similar to that discussed with respect to FIG. 4, below. In some embodiments, assignment may also include configuring physical layer-facing ports of switches 112. In these and other embodiments, assignment may also include enabling or disabling partitioning on ports 110. The output partition list may be applied to the respective partitions 212.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using an information handling system 102 (e.g., by a processor 103 executing instructions stored on a memory 104), another component of system 100 or any other system operable to implement method 300. In certain embodiments, method 300 may be implemented partially or fully in software and/or firmware embodied in computer-readable media.

Figure 4:
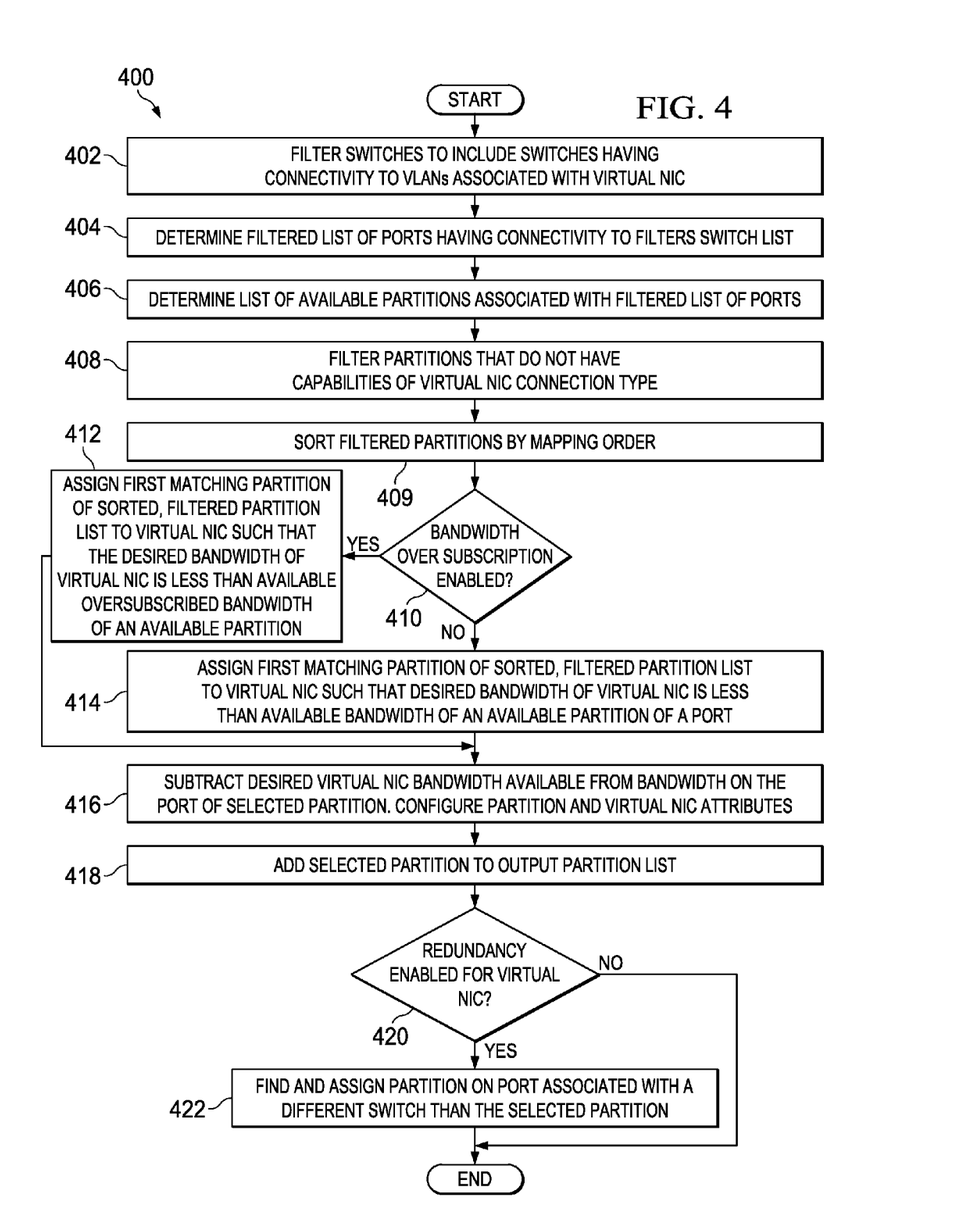
FIG. 4 illustrates a flow chart of an example method for assigning a single virtual NIC to one or more partitions of one or more physical NICs, in accordance with certain embodiments of the present disclosure.

FIG. 4 illustrates a flow chart of an example method 400 for assigning a single virtual NIC 204 to one or more partitions 212 of one or more physical NICs, in accordance with certain embodiments of the present disclosure. According to certain embodiments, method 400 may begin at step 402. As noted above, teachings of the present disclosure may be implemented in a variety of configurations of system 100 as shown in FIGS. 1 and 2. As such, the preferred initialization point for method 400 and the order of the steps comprising method 400 may depend on the implementation chosen. As noted above, method 400 may carry out step 308 of method 300 described above. Method 400 may be executed multiple times, each time assigning a particular virtual NIC 204 to associated partitions 212.

At step 402, the various switches 112 may be filtered such that a filtered list of switches includes only those switches 112 having connectivity to VLANs associated with a the particular virtual NIC 204. For example, referring to FIG. 2, when provisioning vNIC #1 as set forth in workload requirements 202, the filtered list of switches would include switches 3 and 4, as such switches 112 have connectivity with VLAN 6 in accordance with workload requirements 202.

At step 404, a list of ports 110 having connectivity to switches 112 set forth in the filtered switch list may be determined. Referring again to the example of vNIC #1 depicted in workload requirements 202 of FIG. 2, the list of ports 110 would include ports 3 and 4, as such ports 110 have connectivity with switches 112 having connectivity with VLAN 6 in accordance with workload requirements 202.

At step 406, a list of available partitions 212 associated with the ports 110 listed in the list of filtered ports may be determined. In some instances, some of the partitions 212 may be unavailable on account of being assigned to another virtual NIC 204 (e.g., in accordance with method 300 and this method 400), and thus, would be excluded from the list of available partitions 212.

At step 408, those partitions that do not have capabilities of the connection type required for the virtual NIC 204 as set forth in workload requirements 202 may be filtered from the list of available partitions 212 to create a filtered partition list.

At step 409, the filtered partitions may be sorted according to sequence order, mapping order, or other suitable parameter.

At step 410, whether the virtual NIC 204 has bandwidth over-subscription may be determined. If bandwidth over-subscription is enabled, method 400 may proceed to step 412. Otherwise, if bandwidth over-subscription is disabled, method 400 may proceed to step 414.

At step 412, in response to a determination that bandwidth over-subscription is enabled, a first matching partition 212 from the filtered partition list may be assigned to the virtual NIC 204 such that the desired bandwidth of the virtual NIC 204 is less available bandwidth of an available partition and less than available oversubscribed bandwidth of a respective port.

At step 414, in response to a determination that bandwidth over-subscription is disabled, a first matching partition 212 from the filtered partition list may be assigned to the virtual NIC 204 such that the desired bandwidth of the virtual NIC 204 as set forth in workload requirements 202 is less than the available bandwidth of an available partition 212 set forth in the filtered partition list.

At step 416, the desired bandwidth of the virtual NIC 204 may be subtracted from the available bandwidth of the port 110 of the selected partition 212. The virtual NIC 204 may be provisioned on the partition 212 with the various parameters set forth in workload requirements 202 for the virtual NIC 204 (e.g., maximum bandwidth, minimum bandwidth, etc.).

At step 418, the selected partition 212, along with the various provisioned parameters, may be added to the output partition list.

At step 420, a determination may be made regarding whether redundancy is enabled for the virtual NIC 204. If redundancy is enabled, method 400 may proceed to step 422. Otherwise, if redundancy is disabled, method 400 may end.

At step 422, in response to a determination that redundancy is enabled for the virtual NIC 204, another partition 212 on a port 110 associated with a different switch 112 than that of the partition 212 already assigned to the virtual NIC 204 may be assigned and provisioned for the virtual NIC 204 in a manner similar to that set forth in steps 410-418 above. After completion of step 422, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using an information handling system 102 (e.g., by a processor 103 executing instructions stored on a memory 104), another component of system 100 or any other system operable to implement method 400. In certain embodiments, method 400 may be implemented partially or fully in software and/or firmware embodied in computer-readable media.

After each virtual NIC 204 is provisioned, the minimum bandwidth of each partition 212 may be computed as ratio of the minimum bandwidth for the virtual NIC 204 assigned to the partition 212 to the cumulative minimum value of one or more virtual NIC 204 associated to one or more partitions 212 of the port 110.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
 a network interface comprising a plurality of physical ports, each physical port configured to be coupled to a corresponding switch interfacing between the physical port and a switching fabric comprising one or more virtual local area networks; and
 a processor configured to:
  receive workload requirements defining operational parameters for one or more virtual network interface controllers; and
  automatically assign each of the one or more virtual network interface controllers to a partition of one of the plurality of physical ports based on the operational parameters, wherein automatically assigning each of the one or more virtual network interface controllers to a partition of one of the plurality of physical ports comprises, for each virtual network interface controller:
   filtering the corresponding switches to create a filtered switch list comprising switches having connectivity to virtual local area networks specified in the operational parameters to be associated with the virtual network interface controller;
   filtering the ports to create a filtered port list comprising switching having connectivity to the switches of the filtered switch list;
   creating a list of available partitions of the ports of the filtered port list, the available partitions comprising partitions not yet assigned to one of the plurality of virtual network interface controllers; and
   assigning the virtual network interface controller to an available partition on the list of available partitions of one of the plurality of physical ports based on the operational parameters.

2. The information handling system of claim 1, wherein the operational parameters for each virtual network interface controller comprise at least one of a desired bandwidth, an identification of one or more virtual local area networks to have connectivity to the virtual network interface controller, a minimum bandwidth of the virtual network interface controller, whether redundancy is enabled for the virtual network interface controller, and whether bandwidth over-subscription is enabled in accordance with the workload requirements.

3. The information handling system of claim 1, wherein automatically assigning each of the one or more virtual network interface controllers to a partition of one of the plurality of physical ports further comprises, for each virtual network interface controller:
 filtering from the list of available partitions the partitions that do not have capabilities of a desired connection type of the virtual network interface controller to create a filtered partition list; and assigning the virtual network interface controller to an available partition on the filtered partition list based on the operational parameters.

4. The information handling system of claim 1, the processor further configured to, for each virtual network interface controller:
  determine if redundancy is enabled for the virtual network interface controller; and
  if redundancy is enabled for the virtual network interface controller, automatically assign the virtual network interface controller to a second partition of one of the plurality of physical ports based on the operational parameters, such that the second partition is associated with a port associated with a different switch than that of the partition to which the virtual network interface controller is assigned.

5. The information handling system of claim 1, wherein the network interface comprises one or more network interface cards.

6. A computer-implemented method, comprising:
  receiving workload requirements defining operational parameters for one or more virtual network interface controllers; and
  based on the operational parameters, automatically assigning each of the one or more virtual network interface controllers to a partition of one of a plurality of physical ports, wherein each physical port is configured to be coupled to a corresponding switch interfacing between the physical port and a switching fabric comprising one or more virtual local area networks, wherein automatically assigning each of the one or more virtual network interface controllers to a partition of one of the plurality of physical ports comprises, for each virtual network interface controller:
    filtering the corresponding switches to create a filtered switch list comprising switches having connectivity to virtual local area networks specified in the operational parameters to be associated with the virtual network interface controller;
    filtering the ports to create a filtered port list comprising switching having connectivity to the switches of the filtered switch list;
    creating a list of available partitions of the ports of the filtered port list, the available partitions comprising partitions not yet assigned to one of the plurality of virtual network interface controllers; and
    assigning the virtual network interface controller to an available partition on the list of available partitions of one of the plurality of physical ports based on the operational parameters.

7. The method of claim 6, wherein the operational parameters for each virtual network interface controller comprise at least one of a desired maximum bandwidth, an identification of one or more virtual local area networks to have connectivity to the virtual network interface controller, a minimum bandwidth of the virtual network interface controller, whether redundancy is enabled for the virtual network interface controller, sequence order, and whether bandwidth oversubscription is enabled.

8. The method of claim 6, wherein automatically assigning each of the one or more virtual network interface controllers to a partition of one of the plurality of physical ports further comprises, for each virtual network interface controller:
  filtering from the list of available partitions the partitions that do not have capabilities of a desired connection type of the virtual network interface controller to create a filtered partition list; and
  assigning the virtual network interface controller to an available partition on the filtered partition list based on the operational parameters.

9. The method of claim 6, further comprising, for each virtual network interface controller:
  determining if redundancy is enabled for the virtual network interface controller; and
  if redundancy is enabled for the virtual network interface controller, automatically assigning the virtual network interface controller to a second partition of one of the plurality of physical ports based on the operational parameters, such that the second partition is associated with a port associated with a different switch than that of the partition to which the virtual network interface controller is assigned.

10. An article of manufacture comprising:
  a non-transitory computer readable medium; and
  computer-executable instructions carried on the computer readable medium, the instructions readable by a processor, the instructions, when read and executed, for causing the processor to:
    receive workload requirements defining operational parameters for one or more virtual network interface controllers; and
    based on the operational parameters, automatically assign each of the one or more virtual network interface controllers to a partition of one of a plurality of physical ports, wherein each physical port is configured to be coupled to a corresponding switch interfacing between the physical port and a switching fabric comprising one or more virtual local area networks, wherein automatically assigning each of the one or more virtual network interface controllers to a partition of one of the plurality of physical ports comprises, for each virtual network interface controller:
      filtering the corresponding switches to create a filtered switch list comprising switches having connectivity to virtual local area networks specified in the operational parameters to be associated with the virtual network interface controller;
      filtering the ports to create a filtered port list comprising switching having connectivity to the switches of the filtered switch list;
      creating a list of available partitions of the ports of the filtered port list, the available partitions comprising partitions not yet assigned to one of the plurality of virtual network interface controllers; and
      assigning the virtual network interface controller to an available partition on the list of available partitions of one of the plurality of physical ports based on the operational parameters.

11. The article of claim 10, wherein the operational parameters for each virtual network interface controller comprise at least one of a desired maximum bandwidth, an identification of one or more virtual local area networks to have connectivity to the virtual network interface controller, a minimum bandwidth of the virtual network interface controller, whether redundancy is enabled for the virtual network interface controller, sequence order, and whether bandwidth oversubscription is enabled in accordance with the workload requirements.

12. The article of claim 10, wherein automatically assigning each of the one or more virtual network interface controllers to a partition of one of the plurality of physical ports further comprises, for each virtual network interface controller:

filtering from the list of available partitions the partitions that do not have capabilities of a desired connection type of the virtual network interface controller to create a filtered partition list; and assigning the virtual network interface controller to an available partition on the filtered partition list based on the operational parameters.

13. The article of claim 10, the instructions for further causing the processor to, for each virtual network interface controller:

determine if redundancy is enabled for the virtual network interface controller; and if redundancy is enabled for the virtual network interface controller, automatically assign the virtual network interface controller to a second partition of one of the plurality of physical ports based on the operational parameters, such that the second partition is associated with a port associated with a different switch than that of the partition to which the virtual network interface controller is assigned.

14. An information handling system, comprising:

a network interface comprising a plurality of physical ports, each physical port configured to be coupled to a corresponding switch interfacing between the physical port and a switching fabric comprising one or more virtual local area networks; and a processor configured to:

receive workload requirements defining operational parameters for one or more virtual network interface controllers;

automatically assign each of the one or more virtual network interface controllers to a partition of one of the plurality of physical ports based on the operational parameters; and for each virtual network interface controller:

determine if redundancy is enabled for the virtual network interface controller; and if redundancy is enabled for the virtual network interface controller, automatically assign the virtual network interface controller to a second partition of one of the plurality of physical ports based on the operational parameters, such that the second partition is associated with a port associated with a different switch than that of the partition to which the virtual network interface controller is as signed.

15. The information handling system of claim 14, wherein the operational parameters for each virtual network interface controller comprise at least one of a desired bandwidth, an identification of one or more virtual local area networks to have connectivity to the virtual network interface controller, a minimum bandwidth of the virtual network interface controller, whether redundancy is enabled for the virtual network interface controller, and whether bandwidth over-subscription is enabled in accordance with the workload requirements.

16. The information handling system of claim 14, wherein the network interface comprises one or more network interface cards.

17. A computer-implemented method, comprising:

receiving workload requirements defining operational parameters for one or more virtual network interface controllers;

based on the operational parameters, automatically assigning each of the one or more virtual network interface controllers to a partition of one of a plurality of physical ports, wherein each physical port is configured to be coupled to a corresponding switch interfacing between the physical port and a switching fabric comprising one or more virtual local area networks; and for each virtual network interface controller:

determining if redundancy is enabled for the virtual network interface controller; and if redundancy is enabled for the virtual network interface controller, automatically assigning the virtual network interface controller to a second partition of one of the plurality of physical ports based on the operational parameters, such that the second partition is associated with a port associated with a different switch than that of the partition to which the virtual network interface controller is assigned.

18. The method of claim 17, wherein the operational parameters for each virtual network interface controller comprise at least one of a desired maximum bandwidth, an identification of one or more virtual local area networks to have connectivity to the virtual network interface controller, a minimum bandwidth of the virtual network interface controller, whether redundancy is enabled for the virtual network interface controller, sequence order, and whether bandwidth over-subscription is enabled.

19. An article of manufacture comprising:

a non-transitory computer readable medium; and computer-executable instructions carried on the computer readable medium, the instructions readable by a processor, the instructions, when read and executed, for causing the processor to:

receive workload requirements defining operational parameters for one or more virtual network interface controllers;

based on the operational parameters, automatically assign each of the one or more virtual network interface controllers to a partition of one of a plurality of physical ports, wherein each physical port is configured to be coupled to a corresponding switch interfacing between the physical port and a switching fabric comprising one or more virtual local area networks; and for each virtual network interface controller:

determine if redundancy is enabled for the virtual network interface controller; and if redundancy is enabled for the virtual network interface controller, automatically assign the virtual network interface controller to a second partition of one of the plurality of physical ports based on the operational parameters, such that the second partition is associated with a port associated with a different switch than that of the partition to which the virtual network interface controller is assigned.

20. The article of claim 19, wherein the operational parameters for each virtual network interface controller comprise at least one of a desired maximum bandwidth, an identification of one or more virtual local area networks to have connectivity to the virtual network interface controller, a minimum bandwidth of the virtual network interface controller, whether redundancy is enabled for the virtual network interface controller, sequence order, and whether bandwidth over-subscription is enabled in accordance with the workload requirements.

* * * * *